United States Patent [19]

Gerbino

[11] Patent Number: 5,183,710
[45] Date of Patent: Feb. 2, 1993

[54] HYDROPHOBIC INORGANIC MATERIALS AND PROCESS FOR MAKING SAME

[75] Inventor: Anthony J. Gerbino, Homer, N.Y.

[73] Assignee: U-SUS Distributors, Inc., Scottsdale, Ariz.

[21] Appl. No.: 690,009

[22] Filed: Apr. 23, 1991

Related U.S. Application Data

[63] Continuation-in-part of Ser. No. 575,239, Aug. 30, 1990, abandoned.

[51] Int. Cl.$^5$ ............................................. B32B 9/00
[52] U.S. Cl. ............................. 428/405; 106/287.16; 525/477; 427/220; 427/221; 427/387
[58] Field of Search ............... 427/220, 387, 221; 106/287.11, 287.12, 287.13, 287.14, 287.16; 252/382, 383, 384, 385; 428/331, 405, 447, 454; 524/783, 785, 786, 789, 860, 864, 865; 525/477

[56] References Cited

U.S. PATENT DOCUMENTS

| | | | |
|---|---|---|---|
| 2,676,182 | 4/1954 | Daudt et al. | 524/860 |
| 3,023,181 | 2/1962 | TeGrotenhuis | 524/265 |
| 3,027,698 | 9/1965 | Liebling et al. | 252/321 |
| 3,424,598 | 9/1969 | Snyder et al. | 106/2 |
| 3,562,153 | 2/1971 | Tulley et al. | 210/680 |
| 3,623,895 | 11/1971 | Nitzche et al. | 106/2 |
| 3,772,065 | 11/1973 | Seiler | 427/299 |
| 3,948,676 | 4/1976 | Laufer | 106/481 |
| 3,955,985 | 5/1976 | Bosch et al. | 106/2 |
| 3,963,627 | 6/1976 | Cottrell | 252/4 |
| 3,979,546 | 9/1976 | Lewis | 428/405 |
| 4,072,796 | 2/1978 | Reinhardt et al. | 428/405 |
| 4,102,703 | 7/1978 | Tully | 106/287.14 |
| 4,152,165 | 5/1979 | Langager et al. | 106/2 |
| 4,170,690 | 10/1979 | Armbruster et al. | 428/447 |
| 4,183,980 | 1/1980 | Nielsen | 427/215 |
| 4,191,587 | 3/1980 | Kratel et al. | 106/490 |
| 4,208,316 | 6/1980 | Nauroth et al. | 524/789 |
| 4,255,489 | 3/1981 | Nielsen | 428/405 |
| 4,446,040 | 5/1984 | Samanta | 252/62 |
| 4,454,056 | 6/1984 | Kittelmann et al. | 252/174.15 |
| 4,469,517 | 9/1984 | Cooke, Jr. | 106/38.3 |
| 4,474,852 | 10/1984 | Craig | 428/403 |
| 4,478,911 | 10/1984 | Price | 428/332 |
| 4,503,092 | 3/1985 | Klebe et al. | 427/213 |
| 4,544,415 | 10/1985 | Franz et al. | 106/417 |
| 4,648,904 | 3/1987 | DePasquale et al. | 106/2 |
| 4,648,905 | 3/1987 | Peck et al. | 106/24 |
| 4,657,594 | 4/1987 | Struss | 106/409 |
| 4,686,253 | 8/1987 | Struss et al. | 524/44 |
| 4,701,380 | 10/1987 | Narula et al. | 524/860 |
| 4,741,773 | 5/1988 | Kuroda et al. | 106/2 |
| 4,749,590 | 6/1988 | Klingen et al. | 427/54.1 |
| 4,757,106 | 7/1988 | Mayer et al. | 524/262 |
| 4,788,287 | 11/1988 | Matsuo et al. | 544/196 |
| 4,846,886 | 7/1989 | Fey et al. | 106/2 |
| 4,874,431 | 10/1989 | Fey et al. | 106/2 |
| 4,935,483 | 6/1990 | Gamon et al. | 528/31 |
| 5,051,129 | 9/1991 | Cuthbert et al. | 106/2 |
| 5,057,151 | 10/1991 | Schuster et al. | 106/2 |

FOREIGN PATENT DOCUMENTS

| | | | |
|---|---|---|---|
| 637145 | 2/1962 | Canada. | |
| 639916 | 4/1962 | Canada. | |
| 224978 | 6/1987 | European Pat. Off. | 428/447 |

*Primary Examiner*—Shrive Beck
*Assistant Examiner*—Terry J. Owens
*Attorney, Agent, or Firm*—Quarles & Brady

[57] ABSTRACT

A process for rendering an inorganic substrate material hydrophobic includes the step of attaching a coating of hydrophobic silica to the substrate. The hydrophobic silica is preferably mixed initially with the substrate material. At least one bonding agent selected from the group consisting of siloxanes and functionalized silanes, and preferably siloxanes, is then mixed with the hydrophobic silica and substrate material. A dispersion agent can be provided to more evenly distribute the siloxanes and/or functionalized silanes over the hydrophobic silica and substrate material. Heat can be applied after mixing to remove any liquid dispersion agent and to chemically bond the bonding agent to the hydrophobic silica and to the substrate material. Hydrophobic inorganic materials including hydrophobic silica bonded to a substrate by a siloxane or functionalized silane bonding agent.

24 Claims, No Drawings

HYDROPHOBIC INORGANIC MATERIALS AND PROCESS FOR MAKING SAME

CROSS-REFERENCE TO RELATED APPLICATION

This application is a continuation-in-part application of Applicant's co-pending application Ser. No. 575,239, filed Aug. 30, 1990, now abandoned. The pending application hereinabove is incorporated by reference herein and is made a part hereof.

BACKGROUND OF THE INVENTION

1. Field of the Invention

This invention relates to processes and compositions for rendering inorganic substrate materials hydrophobic. This invention also relates to the processing of low cost bulk earthen materials and inorganic industrial waste materials into value added, marketable and useable products.

2. Description of the Prior Art

Hydrophobic silicas are known to be water repellant. This physical feature makes these materials unique in their application, since water is ubiquitous in the environment, and most materials, primarily inorganic materials, are readily wetted by water. Hydrophobic materials can be used in a variety of commercial applications which require this unique physical characteristic. Examples of such materials include AROSIL R-202 by Degussa Chemical Corporation (Richfield Park, N.J.) and CAB-O-SIL TS-530 by Cabot Chemical Corporation (Tuscola, Ill.). Examples are also described in Cottrell (U.S. Pat. No. 3,963,627) and Laufer (U.S. Pat. No. 3,948,676). Unfortunately, however, the relative cost of these hydrophobic silicas make them prohibitive for widespread use and in bulk applications.

The application of siloxanes to earthen and small particle size materials has been described (Price, U.S. Pat. No. 4,478,911). The use of mechanical coatings of hydrophobic silicas over large porous substrates has also been described (Tully, U.S. Pat. No. 4,102,703).

It would be desirable to render small particle size (less than 1 cm in diameter) bulk inorganic materials such as sand, pulverized slag, minerals, incinerator ash, and other industrial waste materials hydrophobic prior to application or fabrication. It would further be desirable to provide materials with longer lasting and more effective hydrophobic properties, which are more resistent to weathering than the products presently available for this application.

SUMMARY OF THE INVENTION

It is an object of the invention to provide processes and compositions for rendering inorganic substrates hydrophobic.

It is another object of the invention to provide processes and compositions which can be utilized to produce large quantities of hydrophobic inorganic materials at relatively low costs and from bulk inorganic material substrates.

It is still another object of the invention to provide new uses for sometimes valueless and environmentally unacceptable bulk inorganic materials such as kiln dust, incinerator ash, pulverized industrial slag and earthen materials such as gravel, sand, crushed stone and pulverized igneous and metamorphic rock.

It is yet another object of the invention to provide processes and compositions for producing improved bulk small-particle size materials by increasing the degree of hydrophobicity, or interfacial surface tension between water and the substrate material of the bulk small-particle size material.

It is another object of the invention to increase the durability, or time of resistance to weathering and erosion, of the hydrophobized product.

These and other objects are accomplished by a process for rendering inorganic substrates hydrophobic in which the substrate is first coated with hydrophobic silica. The hydrophobic silica is then chemically bonded to the substrate by the addition of at least one bonding agent that is preferably selected from the group consisting of siloxanes and functionalized silanes. The functionalized silanes should be capable of forming a siloxane bond with the hydrophobic silica, and should also be capable of chemically bonding to the substrate through a condensation reaction. The hydrophobic silica and the bonding agent are added in appropriate proportions with the bulk substrate material. The exact concentration of each additive depends upon the specific surface area of the substrate.

The components are mixed in order to attain complete homogenization. This homogenization can be facilitated by the addition of a dispersion agent (e.g. methanol, isopropanol) which reduces the surface tension between the three components. Once homogenization of the mixture is achieved, the material is heated, first to drive off and reclaim the dispersion agent, and then to increase the rate of the condensation reaction occurring between the bonding agent, the substrate surface, and the hydrophobic silica surface. These reactions will usually include the reaction of any remaining silanol groups of the hydrophobizing material, generally polydimethyl siloxane, that was used to produce the hydrophobic silica. The result of these reactions is a substrate-bonding agent-hydrophobic silica product that is hydrophobic and capable of use in high bulk operations o for further fabrication.

The hydrophobic silica is preferably added to the substrate in quantities of between about 0.01 and about 10 weight percent, based upon the final product weight. The siloxane and/or functionalized silane bonding agent is then preferably added in an amount between about 0.01 and about 10 percent, by weight of the final product, and preferably between about 0.1 and about 3 weight percent, depending on the specific surface area of the substrate.

The final mixture can be initially heated to between about 90°–100° C. to remove the dispersion agent. The temperatures at which optimum reaction rates occur without destroying the product and/or the reactants range from 200° to 650° C., and preferably from about 375° to 550° C. for a siloxane bonding agent, and preferably from about 100° to 300° C. for a silane bonding agent. The time to complete the reaction depends upon the type and quantity of material being treated and the reaction temperature. The time generally ranges from 5 to 90 minutes, and most preferably is between about 15 to 45 minutes.

DETAILED DESCRIPTION OF THE PREFERRED EMBODIMENT

The present invention provides a process in which hydrophobic silica is chemically bonded to a substrate material to thereby render the substrate hydrophobic. A bonding agent selected from the group consisting of siloxanes and functionalized silanes is provided to chemically bond the hydrophobic silica to the substrate.

The hydrophobic silica can be selected from a number of products suitable for this purpose, as a number of methods for producing hydrophobic silicas are known in the art. A most preferred hydrophobic silica is a siloxane treated silica. This silica offers better water resistance and is generally less expensive. Two examples of hydrophobic silicas are the AROSIL R-202 (TM) from Degussa Chemicals of Richfield Park, N.J., and CAB-O-SIL TS-530 (TM) from Cabot Chemicals of Tuscola, Ill. AROSIL R-202 is produced by a process in which the silanol (Si—OH) groups present in silica are reacted with dialkyl dichlorosilane to chemically combine the methyl groups to the silica and to render the silica hydrophobic. Other processes for producing hydrophobic silica are known in the art and include those described by Reinhardt et al., U.S. Pat. No. 4,072,796, Kratel et al., U.S. Pat. No. 4,191,587 and Klebe et al., U.S. Pat. No. 4,503,092. The disclosures of these references are hereby incorporated by reference. Additional hydrophobizing processes and hydrophobic silicas can also be utilized.

At present this invention utilizes commercial forms of hydrophobic silica due to their availability. It is quite possible, however, that a more preferable hydrophobic silica can be developed that will improve on this present art. Such modifications to the hydrophobic silica could include the application of alternative siloxanes or silanes to improve the bonding, or to increase the reaction rate for bonding, of the hydrophobic silica to the substrate.

The siloxanes and functionalized silanes used as the chemical bonding agent in this invention must be capable of chemically bonding to the hydrophobic silica through a siloxane condensation or redistribution reaction. A condensation reaction occurs when a silanol group (Si—OH) on the hydrophobic silica surface reacts with a hydroxy or alkoxy group of the bonding agent to produce water or an alcohol and an Si—O—Si bond between the hydrophobic silica and the bonding agent. For this reaction, the siloxanes or functionalized silanes will preferably have hydroxy or alkoxy termination groups. A redistribution reaction occurs when a substrate hydroxy group reacts with a silicon on the bonding agent to produce an Si—O—Si bond between the substrate and the siloxane, and a free Si—OH group. The siloxane or functionalized silane bonding agent should further be capable of bonding to the substrate through a condensation o redistribution reaction which forms a Substrate—O—Si bond between the substrate and the bonding agent.

The siloxane will preferably have the formula:

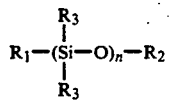

$R_1 = OH, OCH_3, OCH_2CH_3$ $R_2 = H, CH_3, CH_2CH_3$ $R_3 = CH_3, C_6H_5$ $n \geq 1$ Preferred siloxanes include polydimethyl siloxane, polymethylphenyl siloxane, and di-hydroxy or dialkoxy terminated polydimethyl siloxanes. The siloxanes preferably will have viscosities less than 100,000 centistoke and preferably from 50 to 10,000 centistoke. Presently preferred functionalized silanes include N-(2-aminoethyl)-3-aminopropyltrimethoxysilane, 3-methacryloxypropyltrimethoxysilane, 3-glycidoxypropyltrimethoxysilane, and 3-chloropropyltrimethyoxysilane. Silanes which may, in the presence of water, form compounds capable of the desired reactions may also be useful.

Several factors can influence the reaction rate of bonding of the bonding agent to the substrate and to the hydrophobic silica. In general, a decrease in pH, as by the addition of acetic acid, will increase the rate of reaction. An increase in temperature and the availability of surface water present will also usually increase the reaction rate.

A more even distribution of the siloxane over the substrate can be attained by the use of a vapor or liquid dispersion agent or by dispersing the siloxane as an aerosol. Heat can then be applied to remove the dispersion agent and to aid the chemical bonding of the siloxane to the hydrophobic silica and the substrate. The dispersion agent can be selected from a number of suitable materials including liquids and gases. The dispersion agent should be nonreactive with the other components. Liquid dispersion agent are preferably removable with the application of heat. Alcohols, such as isopropanol and methanol, are presently preferred dispersion agent.

Substrates which are rendered hydrophobic by the process of the invention are preferably inorganic, but otherwise can include widely different materials. Presently contemplated substrates include sand, pumice, slag, perlite, mortar, cements, calcined materials, incinerator ash, and other earthen minables. It is preferred that the substrate include, at least at the surface, oxides and hydroxides of silicon, aluminum, titanium or iron since these metal oxides and hydroxides readily form bonds with the siloxane or functionalized silane component. The invention could be used with large substrates, particularly where heating of the reactants is not necessary for acceptable bonding. The substrate will generally, however, be present as particles, which preferably are between about 10 and 1000 microns in diameter or average cross-sectional dimension.

The process of the invention begins with the removal, if necessary, of any organic material or other contaminants associated with the substrate. The substrate is cleaned and dried in order to remove these unwanted materials. Any excess water is also removed, although the removal of water is not always necessary. It is generally preferred to initially add the hydrophobic silica to the substrate and to mix the same. The hydrophobic silica is preferably added at concentrations of between about 0.01 and about 10 weight percent, base upon the final product weight. The amount of hydrophobic silica that must be added will typically depend upon the particle size and the specific surface area of the substrate.

In general, the concentration of hydrophobic silica must increase as the specific surface area of the substrate increases. For example, if the average particle size of the substrate material is 1000 microns in diameter, the specific surface area is relatively small and low concentrations of additive would be required, generally less than 0.1 weight percent. If, however, the substrate is a fine silt or clay (less than about 20 microns in diameter), the specific surface area would be considerably higher and would require greater concentrations of additive, generally 10 per cent or higher.

The specific surface are of the substrate can be determined by several known analytical methods. Also, greater concentrations of hydrophobic silica can be added where greater hydrophobicity of the final product is desired. The resulting substrate/hydrophobic silica mixture is thoroughly mixed in order to provide a homogeneous mixture.

The bonding agent is then added to the dry silica/substrate mixture at a concentration of between about 0.01 and about 10 percent, by weight of the final product. It is generally preferred that the bonding agent be dispersed in a dispersion agent, the type being dependant upon the solubility of the bonding agent that is used. The concentration of the bonding agent in the dispersion agent will depend upon the amount of the bonding agent that is required and the amount of dispersion agent required to thoroughly wet the substrate material. Both increase in direct proportion to the increase in the specific surface are of the substrate. The dispersion agent is then added to the mixture and mixed completely. The dispersion agent can be added by direct mixing, spray applications, or other suitable methods.

The resulting mixed material is dried for several minutes, at between about 70° and about 130° C., and preferably at about 100° C., in order to remove any liquid dispersion agent from the mixture. The dispersion agent can be condensed for reuse. Excess water will also be driven off at this point in the process.

Mixtures utilizing siloxane bonding agents should be heated to approximately 200° to 650° C., and preferably about 375° to 550° C., to increase the rate of chemical bonding in the mixture. This heating process continues for about 5 to 90 minutes, and preferably for about 15 to 45 minutes. The temperature and time requirements will depend upon the type of bonding agent used and the quantity of material present. Mixtures including silane bonding agents should be heated to approximately 100° to 300° C., and preferably to about 150° to 200° C., to increase the rate of chemical bonding in the mixture. This heating process continues for about 5 to 90 minutes, and preferably for about 15 to 45 minutes. The temperature and time requirements will depend upon the type of bonding agent used and the quantity of material present.

The product of the invention is a free flowing material which will not wet out in the presence of water. Upon immersion in water, the material will coalesce into aggregates which, by virtue of the interfacial surface tension, can be molded like putty. Upon subsequent removal from water, the material will revert to its original free flowing, dry state. The finished product will show excellent water repellency with a greater durability to weathering than presently known products. Bulk materials such as sand, pumice, pulverized slag, perlite, mortar, cements, calcined materials, and incinerator ashes can be rendered hydrophobic to provide new uses for such materials. The process of the invention is also capable of converting conventional waste products such as slag, calcined and incinerator ash material into useable and marketable products, thus creating resources from wastes and reducing the quantity and liability of waste materials presently burdening industry. Uses for such waste materials can include the hydrophobizing of municipal solid waste incinerator bottom ash, and subsequent use as a water impervious layer in the construction and maintenance of landfills. Since the material will preferentially oil wet, it can be added directly to oil spills on water surfaces.

Other specific uses for materials produced according to the invention could include, but are not limited to, the following: 1) water impervious layers beneath asphalt, cement, and tarmac surfaces to prevent water migration and subsequent freeze/thawing disintegration; 2) drag reduction coatings for underwater surfaces, such as liner materials for water pipes and ship hulls; 3) water impervious linings for dikes, levees, livestock ponds, irrigation ditches/ponds, radioactive waste management installations, and water transportation canals; 4) sand bags for flood control and water diversion; 5) water sealers for leaking dams, reservoirs, and lakes; 6) water repellant liners beneath concrete slabs, foundation walls, footings, swimming pools, underground storage tanks, piping, piles, and buried cables; 7) coatings on roofing asphalts and tars; 8) leachate and groundwater impervious linings for chemical, municipal, industrial, and hazardous waste sites; 9) absorbents for oil based materials such as crude oils, gasolines, solvents, polychlorinated biphenyls, and animal fats; 10) oil absorbent and containment materials for use on ships, on oil exploration, production, refining, and transportation facilities and vehicles; 11) oil spill absorbent on land and water; and 12) tank farms and refinery contaminant berms.

EXAMPLE 1

100 grams of cleaned 30 mesh sand (+/− 5 mesh) are placed in a beaker. To this sand, 0.3 grams of hydrophobic silica is added and mixed thoroughly. 1.0 gram of Corning 36 (TM-a product of the Dow Corning Company of Midland, Mich.) releasing agent emulsion (33% active) is mixed into 7 cc's of isopropanol. This mixture is added to the dry material and stirred using a spatula for 10 minutes until homogenous.

The material is placed in a heating vessel where it is heated to 550° C. at a rate of about 20° C. per minute. The material is heated for a total of about 45 minutes, and the maximum temperature is maintained for about 20 minutes. During this heating, a color change occurs on the surface of the sand. The sand loses its tan-beige color and takes on a grey-white appearance. A color change is an indication of the termination of the reaction.

EXAMPLE 2

30 grams of perlite with a maximum particle size of 26 microns are placed in a wide mouth beaker. One gram of hydrophobic silica is mixed with the perlite. One gram of silane/siloxane bonding agent is diluted with 9 grams of isopropanol, and this is added to the perlite/silica, while mixing constantly through the addition. The dispersion agent is driven off as the material is heated to about 90° C., and is collected in a condenser. The perlite/silica material is then transferred to the furnace chamber where it is heated to about 550° C. for about 10 minutes.

EXAMPLE 3

200 grams of pumice (0 ½ grade) is placed in a beaker. One gram of hydrophobic silica and one gram of polydimethyl siloxane is added to 10 grams of an isopropanol dispersion agent. The mixture is added slowly to the pumice while agitating in order to ensure complete wetting of the porous pumice. The isopropanol solvent is driven off in a heating step and can thereafter be condensed. The remaining material is heated to 500° C. at a rate of about 20° C. per minute for about 45 minutes.

EXAMPLE 4

60 grams of fly ash is added to a short, wide, and round sealable container which is being rolled horizontally at rate of about 20–40 rpm. The container has a sample injection opening, through which a large (12) gauge needle can be inserted. One gram of hydrophobic silica and one gram of siloxane/silane bonding agent are mixed with 5 cc's of isopropanol in a beaker. The mixture is transferred to the syringe, and the liquid is sprayed into the center of the rolling ash at about 1 cc per 10 seconds. The material is heated to about 100° C. for about 20 minutes, and the volatile vapors are vented out through the needle, which is left in the septum. Final heating is carried out as set forth in the Examples 1-3.

EXAMPLE 5

60 grams of perlite are placed in a large round jar (1000 cc's). Three grams of hydrophobic silica are added to the perlite. In a small beaker 3 grams of siloxane/silane bonding agent are added to 15 grams of isopropanol. The mixture is added to the perlite and the jar is sealed. The mixture is allowed to roll for 16 hours at 20–40 rpm, or is agitated for 16 hours. The homogenized mixture is dried to remove the alcohol fraction, which can be reclaimed as previously described. The remaining material is heated as described in Examples 1-3.

EXAMPLE 6

100 grams of 10/20 sand is added to a large beaker. To this sand is added 0.4 grams of a functionalized silane, diluted to 10% with isopropanol, and the material is mixed thoroughly for 5 minutes. To this mixture, 0.4 grams of hydrophobic silica is added and mixed thoroughly. The mixture is heated to 200° C. for 40 minutes, and the solvent is evaporated and collected.

EXAMPLE 7

100 grams of 10/20 sand is added to a beaker as in Example 6. To the sand is added 0.4 grams of a di-hydroxy terminated siloxane. The material is mixed thoroughly for 10 minutes. 0.4 grams of hydrophobic silica is added to this mixture and the mixture is heated to about 250° C. for 45 minutes.

EXAMPLE 8

100 grams of 10/20 mesh sand is added to a 125 ml beaker. To the sand is mixed 0.2 gm of hydrophobic silica (AROSIL R-202). To the dry mixture, a mixture of 3 gm of isopropanol (IPA) and 1 cc of a 25% solution of acetic acid in water is added and mixed thoroughly with a glass stirrer. To this mixture, 0.5 gm of 3-chloropropyltrimethoxysilane (Dow Corning Z-6076) was added and mixed thoroughly with a glass stirrer. This mixture was then placed in a pre-heated 400° F. oven for 20 minutes. The sample was then cooled and placed in a 16 ounce jar, with 150 cc tap water. The same was rolled at a rate of 50 rpm for 2 hours and evaluated for wetting. No wetting was reported.

EXAMPLE 9

100 grams of pea gravel (diameter approximately 5 to 10 mm) was added to a 250 cc beaker along with 0.1 gm of hydrophobic silica (AROSIL R-202). To this dry mixture, a mixture of 1.8 gm of IPA and 0.5 gm of 25% acetic acid in water was added and mixed thoroughly with a glass stirrer. To this mixture, 0.2 gm of 3-glycidoxypropyltrimethoxysilane (Dow Corning Z-6040) was added and mixed with a glass stirrer. The beaker was then placed in a preheated 400° F. oven for 20 minutes.

This invention can be modified without departing from the spirit or essential attributes thereof, and accordingly, reference should be had to the following claims, rather than to the foregoing specification, as indicating the scope of the invention.

I claim:

1. A process for rendering inorganic substrate materials hydrophobic, comprising the step of applying a bonding agent comprising at least one siloxane to said substrate and to hydrophobic silica, said siloxane bonding agent bonding with said hydrophobic silica to form Si—O—Si bonds, and bonding with said substrate to form Substrate—O—Si bonds.

2. The process of claim 1, wherein after said bonding agent is mixed with said hydrophobic silica and said substrate to produce a mixture, said mixture is heated to increase the rate of chemical bonding of said hydrophobic silica to said substrate.

3. The process of claim 2, wherein said heating step comprises heating said mixture to between about 200° and about 600° C.

4. The process of claim 3, wherein said heating step comprises heating said mixture to between about 375° and about 550° C.

5. The process of claim 1, wherein said siloxane bonding agent has the structure:

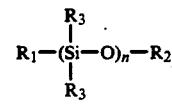

wherein $n \geq 1$; $R_1$=OH, OCH$_3$, OCH$_2$CH$_3$; $R_2$=H, CH$_3$, CH$_2$CH$_3$; and $R_3$=CH$_3$, C$_6$H$_5$.

6. The process of claim 1, wherein said siloxanes are selected from the group consisting of polydimethyl siloxane, polymethyl-phenyl siloxane, and di-hydroxy and dialkoxy terminated polydimethyl siloxanes.

7. The process of claim 1, wherein said siloxanes have viscosities less than about 100,000 centistokes.

8. The process of claim 7 wherein said siloxanes have viscosities ranging from between about 50 and 10,000 centistokes.

9. The process of claim 1, wherein said hydrophobic silica is present in concentrations of between about 0.01 and about 10 weight percent, based upon a final product weight.

10. The process of claim 1, wherein said bonding agent is present in concentrations of between about 0.01 and about 10 percent, by weight of the final product.

11. The process of claim 1, wherein said bonding agent is present in concentrations of between about 0.1 and about 3 weight percent by weight of the final product.

12. The process of claim 1, wherein said substrate is present as particles having a maximum cross-sectional dimension of between about 1 and about 1000 microns.

13. The process of claim 1, wherein said inorganic substrate is selected from the group consisting of sand, pumice, slag, perlite, mortars, cements, and calcined materials.

14. The process of claim 1, wherein said substrate comprises surface components selected from the group consisting of oxides of silicon, aluminum, titanium, and iron.

15. The process of claim 1, wherein said substrate comprises surface components selected from the group consisting of hydroxides of silicon, aluminum, titanium, and iron.

16. A hydrophobic inorganic material, comprising an inorganic substrate, a siloxane bonding agent chemically bonded to said substrate at least by Substrate—O—Si bonds, and a hydrophobic silica, said siloxane bonding agent being chemically bonded to said hydrophobic silica at least by Si—O—Si bonds.

17. The hydrophobic inorganic material of claim 16, wherein said substrate comprises surface components selected from the group consisting of oxides of silicon, aluminum, titanium and iron.

18. The hydrophobic inorganic material of claim 16, wherein said substrate comprises surface components selected from the group consisting of hydroxides of silicon, aluminum, titanium and iron.

19. A process for rendering inorganic substrate materials hydrophobic, comprising the step of applying a bonding agent comprising at least one functionalized silane with said substrate and a hydrophobic silica, said functionalized silane bonding agent chemically bonding with said hydrophobic silica to form Si—O—Si bonds, and bonding with said substrate to form Substrate—O—Si bonds.

20. The process of claim 19, wherein said substrate comprises surface components selected from the group consisting of oxides of silicon, aluminum, titanium and iron.

21. The hydrophobic inorganic material of claim 19, wherein said substrate comprises surface components selected from the groups consisting of hydroxides of silicon, aluminum, titanium and iron.

22. The hydrophobic inorganic material of claim 19, wherein said functionalized silanes are selected from the group consisting of N-(2-aminoethyl)-3-aminopropyltrimethoxysilane, 3-methacryloxy-propyltrimethoxysilane, 3-glycidoxypropyltrimethoxysilane, and 3-chloropropyltrimethoxysilane.

23. The process of claim 19, wherein said functionalized silanes are selected from the group consisting of N-(2-aminoethyl)-3-aminopropyltrimethoxysilane, 3-methacryloxypropyltrimethoxysilane, 3-glycidoxypropyltrimethoxysilane, and 3-chloropropyltrimethoxysilane.

24. A hydrophobic inorganic material, comprising a functionalized silane bonding agent chemically bonded to said substrate at least by Substrate—O—Si bonds, and a hydrophobic silica, said functionalized silane bonding agent being chemically bonded to said hydrophobic silica at least by Si—O—Si bonds.

* * * * *